No. 862,939. PATENTED AUG. 13, 1907.
B. P. RICHARDSON.
PROCESS OF MIXING WITH OR DISSOLVING IN WATER AND DISTRIBUTING MATERIAL TO BE APPLIED TO STREETS, ROADS, OR RAILROADS.
APPLICATION FILED JAN. 14, 1907.
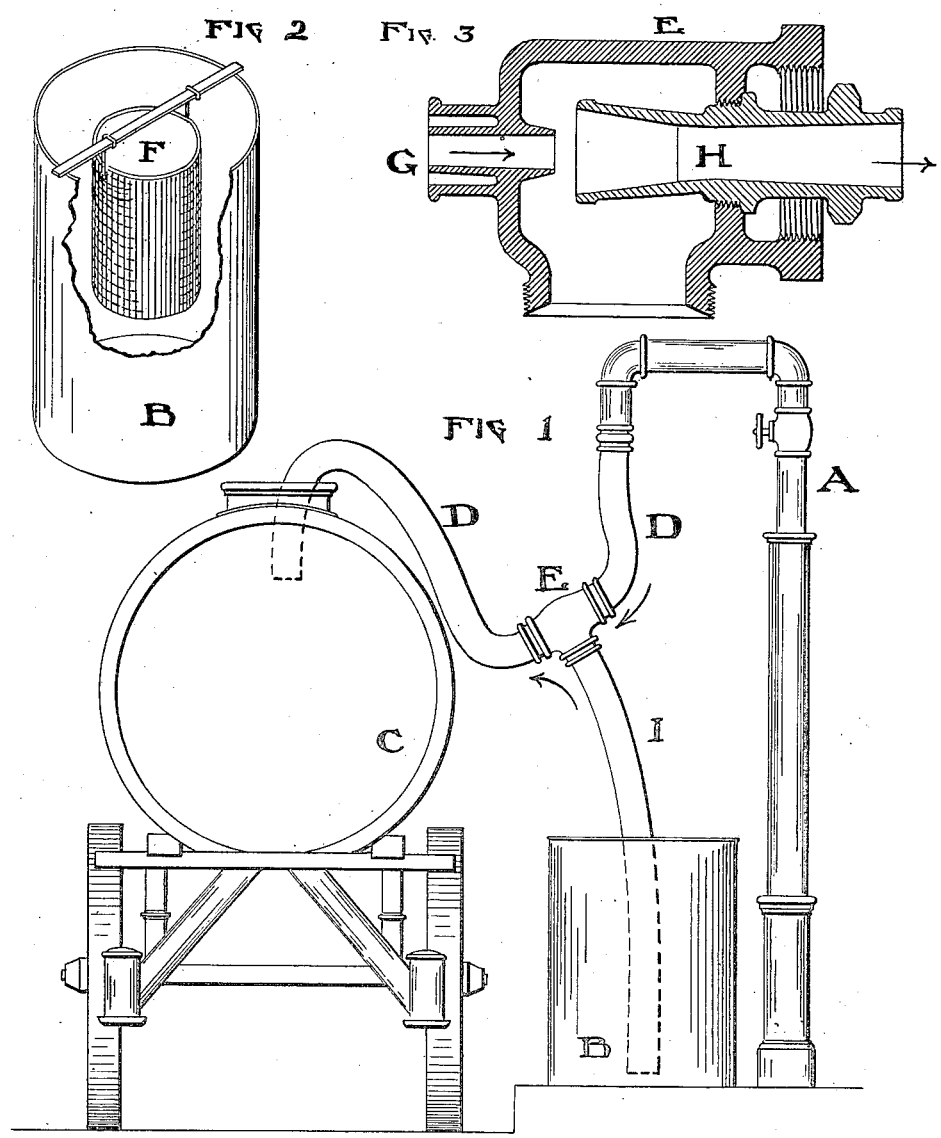
WITNESSES:
INVENTOR.
Benjamin P. Richardson
BY
Donald Campbell
his ATTORNEY.

UNITED STATES PATENT OFFICE.

BENJAMIN P. RICHARDSON, OF BROOKLINE, MASSACHUSETTS.

PROCESS OF MIXING WITH OR DISSOLVING IN WATER AND DISTRIBUTING MATERIAL TO BE APPLIED TO STREETS, ROADS, OR RAILROADS.

No. 862,939.          Specification of Letters Patent.          Patented Aug. 13, 1907.

Application filed January 14, 1907. Serial No. 352,093.

*To all whom it may concern:*

Be it known that I, BENJAMIN P. RICHARDSON, a citizen of the United States, and a resident of Brookline, county of Norfolk, and State of Massachusetts, have invented a new and useful Process of Mixing with or Dissolving in Water and Distributing Material to be Applied to Streets, Roads, or Railroads, of which the following is a specification.

My invention relates to a new and useful process of mixing with or dissolving in water and distributing material to be applied to streets, roads or railroads and consists in the several novel steps and series of steps or operations set forth hereinafter.

The main object of my invention will be understood form the following: It is well known that the dust which is formed upon roads is not only deleterious to health, but is one of the principal elements in the destruction of the road itself; and many excellent roads have been found to be partly destroyed or raveled by the conversion into dust of the constituents of the road. It has been known that certain chemicals or compounds which are hygroscopic or water-absorbing in their nature are adapted to maintain the surface of a road in a moist condition for a certain length of time. Based on this, experiments have been conducted and with results partly satisfactory toward maintaining the surface of a road or the like supplied with such a chemical as I have just mentioned. When a road is so supplied and when the road has been watered artificially or through a shower, or has absorbed the requisite moisture from the atmosphere, the surface maintains a percentage of the water for a maximum period of time. The presence of this moisture is such as to prevent the formation of dust and the destruction of the road, by binding its surface. Hygroscopic chemicals are not the only materials which have the property of binding the road surface and preventing dust formation. Other materials have been experimented with and have succeeded in keeping the dust down. For examples, some materials, such as oil emulsions, will have the same effect by making heavier the particles of dust. Also some materials, such as tar, have the same effect by cementing the dust particles together. My invention relates broadly to any substance which must be diluted with water before application to roads, etc. Although the endeavor to so bind a road surface has been found to give encouraging results, the operations heretofore conducted have been merely experimental in character and upon a very small scale. It has been tried only where the surface to be covered lies within a very small area surrounding the point of distribution; and the principle has not been satisfactorily used on such large scale as would be commercially necessary, because of the prohibitory cost of distributing the chemical or other material over such large area. My new process or system is one devised by me to make the application of this principle commercially available. It is useful with chemicals, compounds, solutions, mixtures and emulsions.

I will now describe the best embodiment of my system and process and a form of apparatus for carrying out the same.

In the drawings annexed hereto, Figure 1 represents in elevation an essential portion of the apparatus necessary for carrying out my process; so far as it is necessary to show such apparatus. Fig. 2 shows in perspective a preferred form of supply tank. Fig. 3 shows the details of a suitable form of ejector for use in connection with the apparatus shown in Fig. 1.

Similar letters of reference are employed to designate corresponding parts in the several figures of the drawings.

My process or system relies, as any other system would, upon the usual hydrants, such as the street hydrant connected with a water main containing water under pressure; and also a system of distributing carts, such as the ordinary watering carts that we see daily on our streets; and other apparatus is employed as will hereinafter appear. Having determined the available pressure in the water main or hydrant and the best strength of solution to be applied to the road my process may be carried on as follows: Near each hydrant from which distribution is to be made to contiguous territory there will be several, for example four or five, supply tanks, which merely rest upon the ground, and designed to contain or have formed in them a concentrated mixture or solution which is afterwards to be diluted and distributed.

A represents the ordinary form of street hydrant. B represents the supply tank above mentioned. C represents an ordinary watering cart. D, D represent the hose or connection extending from the hydrant A to the watering cart C. E represents an ejector interposed in the connection D, D, and the details of said ejector are illustrated in Fig. 3. F represents a perforated or wire-work basket or receptacle in which a chemical or compound may be suspended within the supply tank B. Starting with a number of hydrants so arranged, and suitably covering the territory to be watered, the best method of applying my process will be substantially as follows: Material, such as the dry chemical, the mixture or the emulsion, whichever be employed, will be taken in wagons or otherwise in the most condensed form and therefore in the largest quantity for a given wagon space; and placed in the several supply tanks B near the hydrants in the section over which the material is to be distributed. It will then be dissolved in said tanks, where dissolving is necessary in the process. To permit such dissolving at the least expense the material can be placed in the receptacle F in proper quanty and said receptacles suspended at the top within the tanks B. By suspending the material at the top of the tanks I attain a special advantage in that as fast as the material dissolves and the liquid surrounding it becomes heavier, such liquid will sink owing to its greater specific gravity and will thus automatically maintain a current of water which effects the solution with the least expenditure of time and labor, and dispenses with such artificial agitation as has heretofore been employed. The dissolving, for example, would be accomplished over night and in the morning the watering cart could take its supply in the manner now to be described. It contemplates the use of an ejector or equivalent instrument. Generally speaking, the principle of an ejector is well understood. When water is passed through the ejector E in the direction indicated by the arrows, Figs. 1 and 3, it passes first through a nozzle-like passage G and thence, with a high velocity, is forced into the exit tube H, whence it passes on to the watering cart. Between G and H is a space about which there is a tendency to create a partial vacuum or suction, owing to the velocity of the water. This suction is sufficient to draw from the supply tank B the concentrated solution which it contains; and the passage of the concentrated solution from the tank B to the ejector E may or may not be through a separate connection I. In any case the concentrated solution mixes with the water coming from the hydrant A in fixed or predetermined proportions and the mixture passes on to the watering cart C, where it arrives necessarily in a perfectly mixed condition, requiring no stirring nor agitation.

The many advantages of the above system in the saving of apparatus and of expense for carting will be seen by anyone who has made a study of the matter. Some of the advantages may be here recited. In the first place, the chemical or other material may be carted to the nearest hydrant, from which it is to be distributed, in its most condensed form and thereby saves an immense amount of carting of water which would be necessary if the solution were first formed in a central plant and then sent out on wagons to the several distributing hydrants. The chemical and water are combined into a concentrated liquid without manual labor. The concentrated solution is diluted with water in a given, predetermined proportion and this is not only done thoroughly, requiring no agitation, but is done automatically, without manual labor; that is, pumping from the supply tank is unnecessary, nor does the tank need to be elevated above the ground, as the suction of the ejector is sufficient. Moreover, a large central plant for forming the solutions is rendered unnecessary, together with the expense of conducting such a plant, and of carting the mixture to points nearest where it is to be applied.

When such a system as that above described is employed and the roads or streets have been treated with chemical or material, then an enormous saving of expense, for both labor and water, is effected by reason of the fact that the watering carts will need to make their trips only at long intervals instead of, as is sometimes the case, a number of times per day over the same portion of road. My system contemplates moving from section to section of the territory to be covered. The attendant wagons operate in harmony with the watering carts, by moving the supply tanks from day to day, or as soon as emptied, to the section to be treated the following day. I thus establish a circuit enabling the application of the treatment by a few watering carts which on completing the circuit of sections return to the starting point and continue around again, interrupting the process only when natural conditions render watering unnecessary.

What I claim as my invention is:

1. The system of distributing materials upon roads, etc., consisting in maintaining several supply tanks near the hydrant carting the materials to said tanks and forming a mixture or solution thereof, and afterward simultaneously diluting and delivering the same to a watering cart by conducting water from the hydrant through an ejector to said cart the ejector automatically drawing from said tank the desired proportion of concentrated liquid.

2. The system of distributing material upon roads, etc., consisting in employing a number of supply tanks near the hydrants, one or more of such tanks for each cart load of diluted liquid to be distributed, carting the concentrated materials to said hydrants whereby the tanks may be supplied with concentrated liquid containing such materials; and afterwards simultaneously diluting and delivering the same to a watering cart by conducting water from the hydrant through an ejector, automatically drawing from said tank the desired proportion of concentrated liquid, and lastly applying the diluted liquid to the road or other surface.

3. The system of distributing material on roads which consists in distributing at desired hydrants tanks containing the necessary ingredients, dissolving such ingredients in water or mixing them therewith, and subsequently diluting the solution or mixture by water from the hydrant with the aid of an ejector for automatically controlling the dilution, and then distributing such diluted product upon the road surface.

4. The system of distributing material on roads, etc., which consists in distributing at desired hydrants tanks for containing the necessary ingredients, supplying said tanks with such ingredients in concentrated liquid form (solution or mixture), and subsequently diluting the solution or mixture by water from the hydrant with the aid of an ejector for automatically controlling the dilution, and then distributing such diluted liquid upon the road surface.

In testimony whereof I have hereunto put my hand this 12th day of January A. D. 1907.

BENJAMIN P. RICHARDSON.

In presence of—
F. H. BLISS,
CHARLES E. DOW.